Dec. 18, 1934.  W. G. POWEL  1,984,985
MACHINE FOR THE MANUFACTURE OF ROOFING TILES, BRICKS,
PAVING SLABS, PAVING TILES, AND THE LIKE
Filed Feb. 7, 1934

INVENTOR.
WILLIAM GRIFFITH POWEL.
By Benj. J. King.
ATTORNEY.

Patented Dec. 18, 1934

1,984,985

UNITED STATES PATENT OFFICE 1,984,985

MACHINE FOR THE MANUFACTURE OF ROOFING TILES, BRICKS, PAVING SLABS, PAVING TILES AND THE LIKE

William Griffith Powel, Mitcham Common, England

Application February 7, 1934, Serial No. 710,199 In Great Britain January 4, 1933

2 Claims. (Cl. 25—1)

This invention relates to machines for manfacturing roofing tiles, bricks, paving slabs and the like and has particular reference to mechanism for driving the pack roller so that it is rotated intermittently or step-by-step only during the movement in one direction of the reciprocating pallet carriage, the pack roller being stationary during the return movement of the pallet carriage.

The object of the present invention is to provide a simple form of mechanism for driving the pack roller intermittently and unidirectionally which eliminates entirely the elaborate and complicated means hitherto employed for this purpose.

Broadly, the invention consists in driving the pack roller by means of a "free-wheel" or unidirectional device operated by one or more toothed members moving in unison with the reciprocatory movements of the pallet carriage. Each toothed member is preferably in the form of a solid or flexible rack; in the latter case the rack is of chain form and maintained in tension or stretched condition by weight. The rack or racks may be directly connected to the reciprocating pallet carriage, to the crank operating the carriage, to the rod which connects the crank to the carriage, or to some other member of the machine whereby the rack or racks are reciprocated in unison with the movements of the carriage.

The "free-wheel" or unidirectional device may be of any known form, such as a single ratchet-and-pawl mechanism, or a gapped wheel carrying wedging elements on its periphery which make locking engagement with a drum-like housing in one direction of rotation only.

Figure 1:
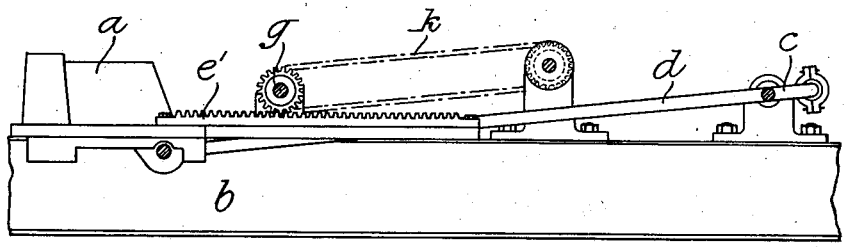
Figure 2:
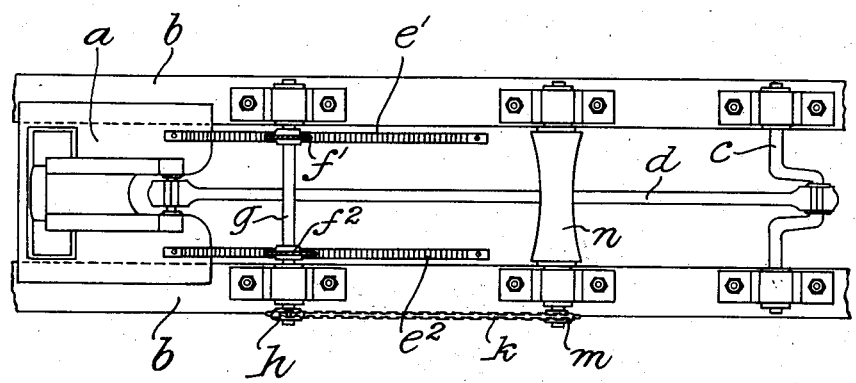

An embodiment of the invention is illustrated by the accompanying drawing, wherein:

Figures 1 and 2 are an elevation and plan, respectively, of the pack roller drive.

The pallet carriage $a$ is slidably mounted upon the frame $b$ and is reciprocated by the crank $c$ through the connecting rod $d$. A pair of solid toothed racks $e^1$, $e^2$ are fixed to and rearwardly extend from the pallet carriage $a$ and thus move simultaneously therewith. These racks $e^1$, $e^2$ are in constant mesh with complementary pinions $f^1$, $f^2$ respectively, carried on the cross shaft $g$ to which is secured a sprocket wheel $h$. The rotatory movements of the sprocket wheel $h$ are conveyed by a crank $k$ to a free-wheel device $m$ which transmits motion in one direction only to the pack roller $n$. By means of the mechanism illustrated, a rotary movement is imparted to the pack roller $n$ only during one half-revolution or stroke of the crank $c$, which is effected on the return movement of the reciprocating racks $e^1$, $e^2$ the "free-wheel" device $m$ reversing without affecting the pack roller $n$ which remains stationary until the next outward movement of the pallet carriage $a$ and racks $e^1$, $e^2$.

I claim:—

1. A machine for manufacturing roofing tiles, bricks, paving slabs and the like comprising a frame, a pallet carriage slidably mounted on said frame, means for reciprocating said pallet carriage, a pack roller mounted on the frame, and a connection between said pallet carriage and said pack roller whereby reciprocation of the former rotates the latter intermittently and in only a single direction.

2. A machine for manufacturing roofing tiles, bricks, paving slabs and the like comprising a frame, a pallet carriage slidably mounted on said frame, means for reciprocating said pallet carriage, a pack roller mounted on the frame and having a shaft, and means connecting said pallet carriage with said pack roller whereby reciprocation of the former rotates the latter intermittently and in only a single direction, said means comprising a cross shaft mounted on the frame, a pinion on said cross shaft, a rack bar on the pallet carriage in mesh with said pinion, sprocket wheels on said cross shaft and said pack roller shaft, respectively, a chain connecting said sprocket wheels, and a connection between one of said sprocket wheels and its related shaft whereby said wheel is freely rotatable in one direction relative to its related shaft and when rotated in the other direction positively drives its related shaft.

WILLIAM GRIFFITH POWEL.